(12) United States Patent
Vasseur et al.

(10) Patent No.: US 7,675,848 B2
(45) Date of Patent: Mar. 9, 2010

(54) DYNAMIC FORWARDING ADJACENCY

(75) Inventors: Jean-Philippe Vasseur, Dunstable, MA (US); Stefano B. Previdi, Rome (IT); David D. Ward, Somerset, WI (US); Robert Goguen, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 969 days.

(21) Appl. No.: 10/891,704

(22) Filed: Jul. 15, 2004

(65) Prior Publication Data

US 2006/0013125 A1   Jan. 19, 2006

(51) Int. Cl.
*G01R 31/08* (2006.01)

(52) U.S. Cl. ............ 370/216; 370/217; 370/218; 370/221; 370/242; 370/244; 370/245; 370/248; 370/351; 370/355; 370/356; 370/386; 370/408; 370/437; 455/445; 455/450; 455/452.1

(58) Field of Classification Search ......... 370/216–231, 370/242–248, 351–360, 386, 408, 437; 455/445, 455/450, 452.1
See application file for complete search history.

(56) References Cited

U.S. PATENT DOCUMENTS

| | | | |
|---|---|---|---|
| 6,018,576 A * | 1/2000 | Croslin | 379/22.03 |
| 6,233,239 B1 | 5/2001 | Benayoun et al. | |
| 6,470,013 B1 | 10/2002 | Barach et al. | |
| 6,594,709 B1 | 7/2003 | Agasaveeran et al. | |
| 6,631,134 B1 | 10/2003 | Zadikian et al. | |
| 6,724,757 B1 | 4/2004 | Zadikian et al. | |
| 7,054,272 B1 * | 5/2006 | Noel et al. | 370/241 |
| 7,286,467 B1 * | 10/2007 | Sylvain | 370/216 |
| 2003/0088698 A1 | 5/2003 | Singh et al. | |
| 2005/0073650 A1 * | 4/2005 | Ito | 351/200 |
| 2005/0088965 A1 * | 4/2005 | Atlas et al. | 370/216 |
| 2005/0152269 A1 * | 7/2005 | Liu | 370/225 |
| 2005/0195741 A1 * | 9/2005 | Doshi et al. | 370/230 |
| 2005/0265228 A1 * | 12/2005 | Fredette et al. | 370/216 |
| 2008/0002669 A1 * | 1/2008 | O'Brien et al. | 370/352 |

\* cited by examiner

*Primary Examiner*—Aung S Moe
*Assistant Examiner*—Christopher P Grey
(74) *Attorney, Agent, or Firm*—Cesari and McKenna, LLP

(57) ABSTRACT

A technique treats a protected forwarding adjacency (FA) as a dynamic entity in that it allows a backup tunnel associated with the FA to carry traffic for the FA, when it's primary tunnel has failed, up to a predetermined amount of time. If after the predetermined amount of time has elapsed and the FA has not recovered (e.g., the primary tunnel has not been reestablished), a network topology change is automatically triggered causing the network to converge on a new network topology. By triggering the network topology change, a path that is more optimal than the path associated with the backup tunnel may be subsequently determined to carry the traffic.

28 Claims, 6 Drawing Sheets

DYNAMIC FORWARDING ADJACENCY

BACKGROUND OF THE INVENTION

1. Field of the Invention

The present invention relates to data networking and specifically to maintaining forwarding adjacencies in a data network.

2. Background Information

A data network is a geographically distributed collection of nodes interconnected by communication links and segments for transporting data between end stations, such as computers. Many types of network segments are available, with the types ranging from local area networks (LANs) to wide area networks (WANs). LANs typically connect nodes, such as personal computers and workstations, over dedicated, private communications links located in the same general physical location, such as a building or a campus. LANs may also connect intermediate nodes, such as routers, that are co-located within a close range.

WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Certain intermediate nodes, such as routers, are often configured to "route" data, such as packets, between various nodes in the network. Routing is typically performed at the network layer or layer-3 (L3) of the Open Systems Interconnect Reference Model (OSI-RM). Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains a L3 destination address of a destination node and interface information about an interface (e.g., a port) on the router through which the destination node may be reached. A data packet containing a destination address that matches a destination address of an entry in the routing table is forwarded by the router to the interface specified by the matching entry for transfer to the destination node.

In addition, a router may maintain a link-state database (LSDB) which is often configured to hold link-state information about data links in the data network. Here, the router may derive a topology of the network using the link-state information in the LSDB. The router may further use the link-state information along with information contained in advertisement messages (described below) received by the router to determine if the topology of the network has changed.

A router may execute one or more routing protocols that enable the router to route packets and exchange routing and link-state information with other routers in the network. The routers may use this information to, inter alia, configure (e.g., compute) their FDBs and LSDBs. The routing protocols may include link-state protocols, such as the Intermediate-System-to-Intermediate-System (IS-IS) protocol or the Open Shortest Path First (OSPF) protocol. Routing and link-state information is typically exchanged between the routers in the form of advertisement messages. For example, nodes executing the IS-IS protocol exchange routing and link-state information using an advertisement message called a link-state packet. Likewise, nodes executing the OSPF protocol exchange routing and link-state information using an advertisement message called a link-state advertisement (LSA). As used herein, an advertisement message refers generically to a message that an intermediate node uses to convey routing and/or link-state information to other intermediate nodes in the network.

An intermediate node that acquires an advertisement message may use information contained therein to update its FDB and LSDB, and maintain a topology of the network. If the network topology changes (e.g., a link fails), an intermediate node detecting the change usually updates it's FDB and LSDB, and generates one or more advertisement messages that account for the change. The intermediate node may then flood the advertisement messages to its neighboring nodes, thereby triggering a "network convergence." That is, the neighboring nodes acquire the advertisement messages, update their FDBs and LSDBs based on information contained in the advertisement message and flood the advertisement message to their neighboring nodes and so on. This process may continue until all the intermediate nodes in the network have updated their FDBs and LSDBs and have "converged" on a new network topology that reflects the changed network topology.

Routers may transfer data packets through the network between a source and destination in a "connection-oriented" manner using a connection-oriented protocol. A connection-oriented protocol transfers data packets through the network over a predefined path, often called a connection or circuit, that is established between the source and destination. Here, the connection or circuit is established between the source and destination before any data are transferred. After the connection has been established, data are transferred between the source and destination over a path defined by the connection. When the connection is no longer needed, the connection is typically "torn down" and resources, such as nodes, interfaces, protocols and so on, utilized by the connection are made available for other connections. A resource, as used herein, refers to entities associated with an intermediate node. These entities may include the intermediate node itself, an interface (e.g., a port) on the intermediate node and a protocol running on the intermediate node. An example of a connection-oriented protocol is the Multiprotocol Label Switching (MPLS) protocol. MPLS provides a framework that embodies various features enabled by a connection-oriented link layer including, e.g., Quality of Service (QoS), Traffic Engineering and Constraint-based Routing (CR).

Some connection-oriented protocols utilize unidirectional connections, i.e., connections that transfer data in one direction from a source to a destination. For example, a unidirectional connection between a router A and a router B transfers data in one direction from router A to router B. In order to transfer data in the other direction, i.e., from router B to router A, another unidirectional connection from router B to router A would have to be established. The connections may be "signaled" end-to-end using a signaling protocol, such as the Resource Reservation Protocol (RSVP). The end of the connection that initiates the signaling for the connection is often called the "head-end" of the connection and the end of the connection that terminates the signaling is often called the "tail-end" of the connection. The router hosting the head-end of the connection is often called the head-end node and the router hosting the tail-end of the connection is often called the tail-end node. Thus, for example, in a connection from a source to a destination where router A hosts the "head-end" of the connection and router B hosts the tail-end of the connection, router A is the head-end node and router B is the tail-end node.

To accommodate high availability, some connection-oriented protocols include techniques that enable various links, e.g., in a MPLS label-switched path (MPLS LSP), to be protected from failure by a backup tunnel. For example, P. Pan, et al., "Fast Reroute Extensions to RSVP-TE for LSP Tunnels," draft-ietf-mpls-rsvp-fastreroute-04.txt, available from the Internet Engineering Task Force (IETF), http)://www.ietf.org describes a MPLS "fast reroute" (FRR) technique that may be used to quickly reroute a set of traffic engineered (TE) MPLS LSPs around a failed "protected" link, shared risk link group (SRLG) or node onto a pre-signaled "backup" tunnel. In a typical arrangement, two MPLS LSP tunnels, i.e., a primary tunnel and the backup tunnel, are created for a link to protect the link. Traffic normally carried by the link is carried on the primary tunnel. If the primary tunnel fails, e.g., due to a failure of a physical link used by the primary tunnel, the backup tunnel carries data traffic destined for the primary tunnel. The backup tunnel acts as a "fast-reroute" for the primary tunnel and obviates having to resort to other perhaps costlier measures, such as tearing down the primary MPLS TE LSP and establishing a new primary MPLS TE LSP around the failed network element.

A MPLS TE LSP may be "announced" as a "link" in an advertisement message in order to make the MPLS TE LSP appear as a single "physical link" to other intermediate nodes in the network even though it may actually span one or more physical links in the network. A MPLS TE LSP advertised in this manner is often called a "forwarding adjacency" (FA). FAs are described in K. Kompella, et al., "LSP Hierarchy with Generalized MPLS TE," draft-ietf-mpls-lsp-hierarchy-08.txt, available from the IETF. As with other MPLS TE LSPs, a MPLS TE LSP associated with a FA may be protected by employing a protection scheme, such as the MPLS FRR scheme described above. Here, a primary tunnel is established as a FA, wherein the primary tunnel is configured to normally carry traffic and the backup tunnel is configured to carry traffic for the FA should the primary tunnel fail.

An advantage with protected FAs is that the time it takes to "switch over" from the primary tunnel to the backup tunnel is typically on the order of tens of milliseconds and is often seamless to the network. The switchover time is considerably faster than if the intermediate nodes had to converge on a new network topology that takes into account the failure. Further, since the switchover is seamless, a network topology change is not triggered thus, obviating the need for the network to converge on a new network topology which may consume valuable time and potentially cause network outages. In other words, because the primary tunnel is configured as a FA and is protected with a local repair mechanism, such as FRR, the network topology remains unchanged for the other nodes of the network. Indeed, the FA MPLS TE LSP is locally rerouted onto the backup tunnel and is still announced as a physical link in advertisement messages.

A disadvantage with protected FAs is that they are not dynamic. That is, data may be carried on the backup tunnel of a failed FA indefinitely until e.g., the failure is no longer present and the FA's primary tunnel is re-established (recovers). If the backup tunnel of the failed FA follows a less than optimal path, network efficiency and performance may suffer for an unacceptable period of time.

SUMMARY OF THE INVENTION

The present invention overcomes shortcomings associated with the prior art by treating a protected forwarding adjacency (FA) as a dynamic entity in a data network such that it allows a backup tunnel associated with the FA to carry traffic for the FA, when the FA's primary tunnel has failed, up to a predetermined amount of time. If the predetermined amount of time has elapsed and the FA has not recovered (e.g., the FA's primary tunnel has not been reestablished), a network topology change is automatically triggered causing the network to converge on a new network topology. By triggering the network topology change, a path that is more optimal than the path associated with the backup tunnel may be subsequently determined to carry the traffic.

In the illustrated embodiment of the invention, an intermediate node predetermines the amount of time a backup tunnel may carry traffic for a failed FA based on a history of down time of a primary tunnel associated with the FA. After the primary tunnel associated with the FA fails, the intermediate node monitors the FA and determines if the FA has recovered (e.g., FA's primary tunnel has been reestablished). If the FA has not recovered within the predetermined amount of time, the intermediate node triggers a network topology change by generating and flooding an advertisement message that reports the FA as failed link. This, in turn, causes intermediate nodes in the network to converge on a new network topology.

Advantageously, by automatically triggering a topology change some time after the FA's backup tunnel begins carrying traffic for the FA, the inventive technique causes the network to converge on a new topology that may include a path that is more optimal than the path used by the FA's backup tunnel.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
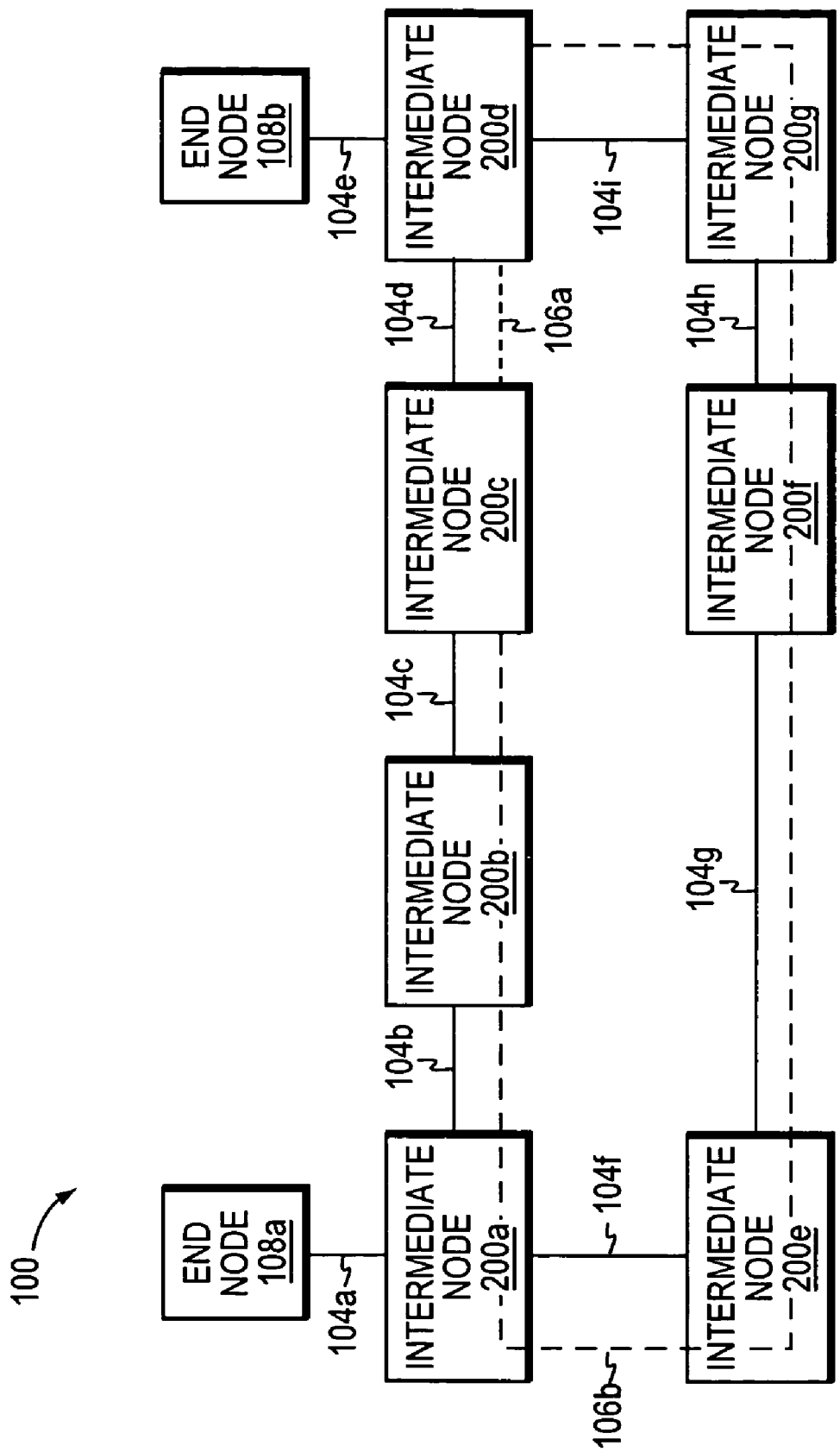
FIG. 1 is a high-level schematic block diagram of a data network that may be advantageously used with the present invention.

FIG. 1 is a schematic block diagram of a data network 100 that may be advantageously used with the present invention.

The data network 100 comprises a collection of communication (data) links 104 connected to a plurality of network entities, such as end nodes 108 and intermediate nodes 200, to form an internetwork of computer nodes. These internetworked nodes communicate by exchanging data packets according to a predefined set of protocols, such as the Transmission Control Protocol/Internet Protocol (TCP/IP). A protocol, as used herein, is a set of formal rules describing how to transfer data between two entities in a data network.

Figure 2:
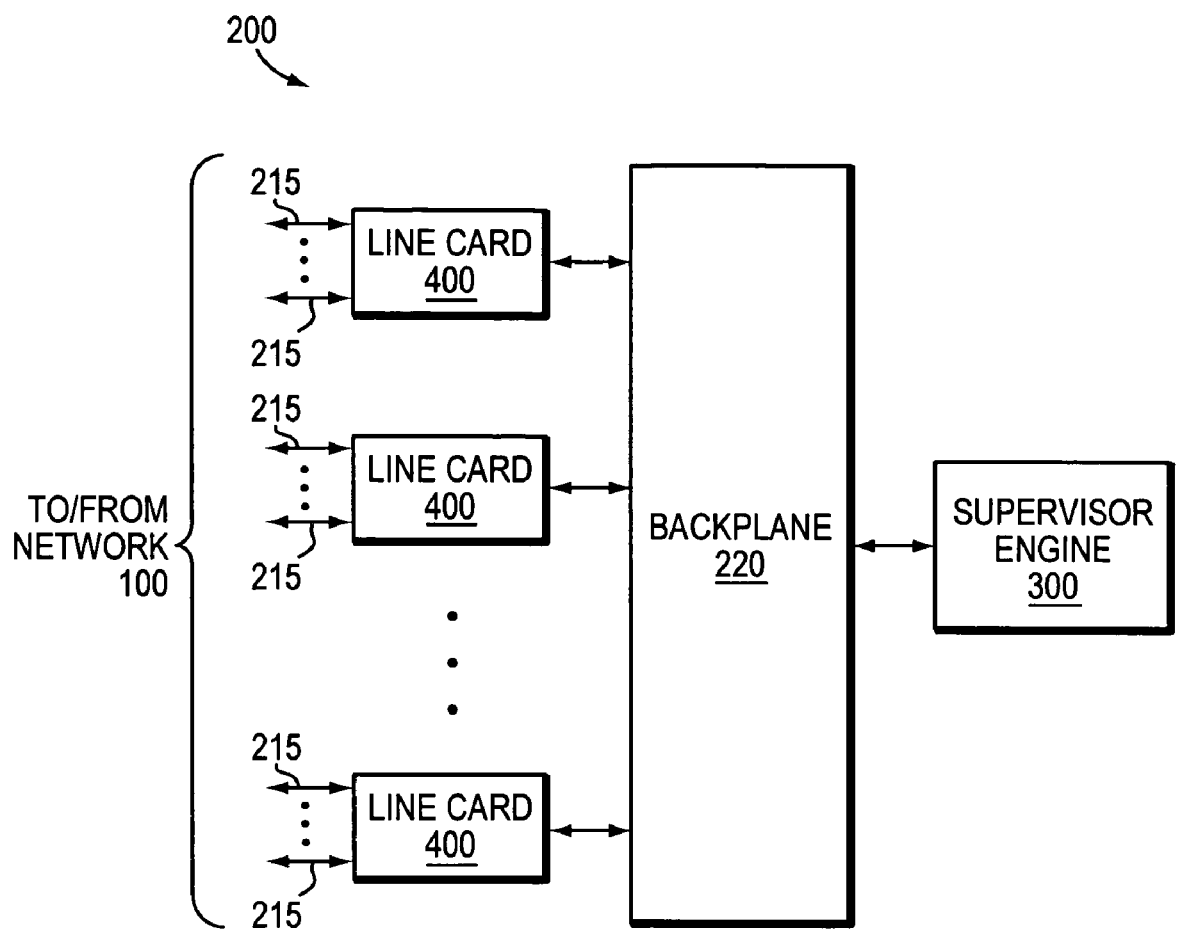
FIG. 2 is a high-level schematic block diagram of an intermediate node that may be advantageously used with the present invention.

FIG. 2 is a high-level partial schematic block diagram of intermediate node 200, which is illustratively a router. Suitable intermediate nodes that may be used with the present invention include the Cisco 7200, 7600 and 12000 Series routers available from Cisco Systems Incorporated, San Jose, Calif. Intermediate node 200 comprises one or more line cards 400 and a supervisor engine card 300 interconnected by a backplane 220. Node 200 is configured to perform, inter alia, various conventional layer-2 (L2) and layer-3 (L3) switching and routing functions including maintaining forwarding adjacencies (FAs) in accordance with the inventive technique. As used herein, L2 and L3 refer to the data link layer and network layer, respectively, of the Open Systems Interconnection reference model (OSI-RM). Node 200 is also configured to support various protocols which may include Open Shortest Path First (OSPF), Intermediate-System-to-Intermediate-System (IS-IS), Multiprotocol Label Switching (MPLS), TCP/IP, IP fast reroute (FRR), MPLS FRR, Ethernet, Asynchronous Transfer Mode (ATM), and Frame Relay (FR).

The backplane 220 comprises a point-to-point interconnect bus that interconnects the various cards and allows data and signals to be transferred from one card to another. The line cards 400 connect (interface) the intermediate node 200 with the network 100. The line cards 400 transfer and acquire data packets to and from the network via ports 215 using various protocols such as, ATM and Ethernet. Functionally, the line cards 400 acquire data packets from the network 100 via the ports 215 and forward the data packets to the data bus 220 as well as transmit data packets received from the data bus 220 to the network 100 via the ports 215. The ports 215 may comprise, e.g., ATM, Ethernet, Fast Ethernet (FE), Gigabit Ethernet (GE), and FR ports.

Figure 3:
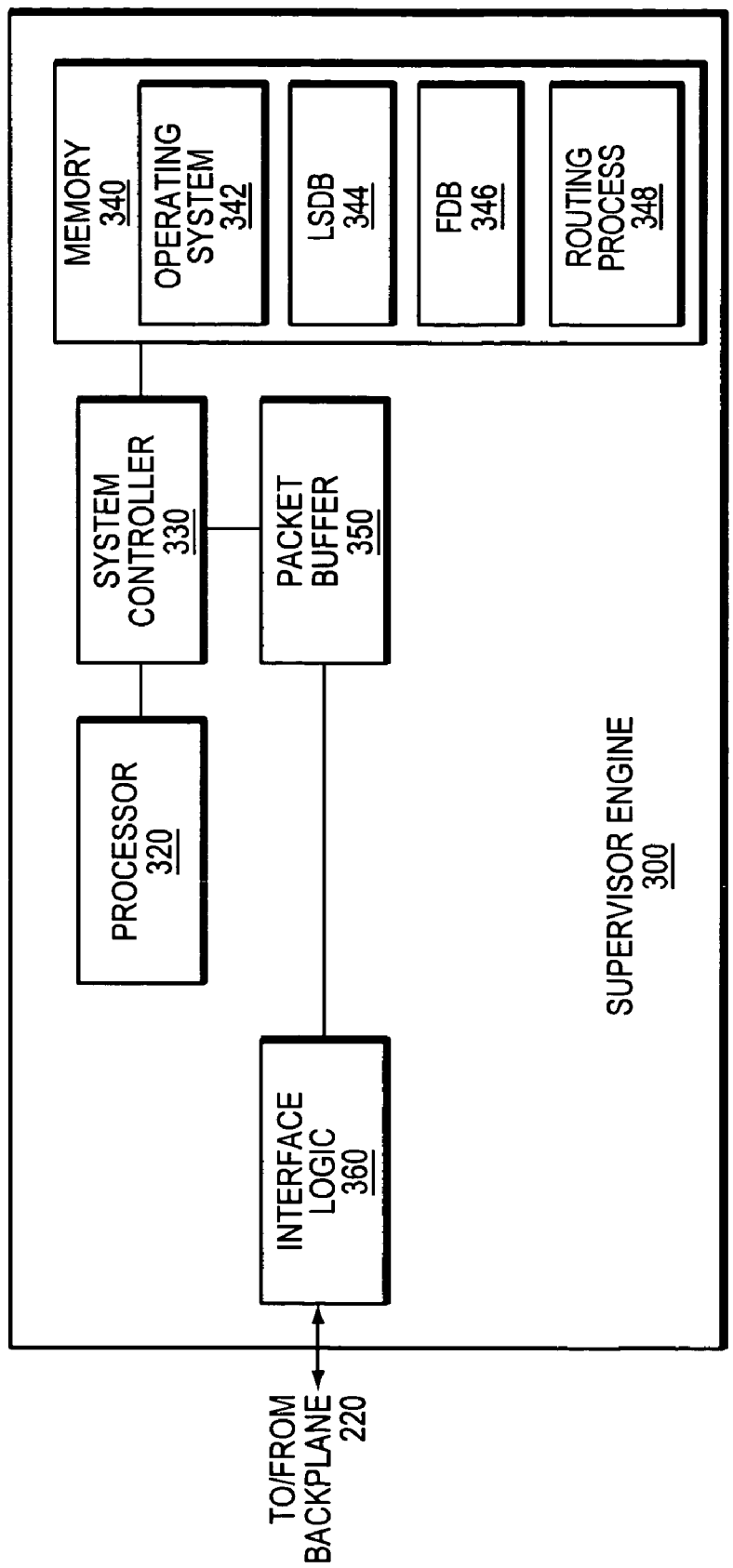
FIG. 3 is a partial schematic block diagram of a supervisor engine that may be used with the present invention.

The supervisor engine 300 comprises logic that is, inter alia, configured to manage node 200, maintain a centralized forwarding database (FDB) that it distributes to the line cards 400, maintain a link-state database (LSDB) and execute various protocols, such as OSPF, IS-IS, MPLS, MPLS FRR, IP, and IP FRR. Moreover, engine 300 performs other functions including functions that incorporate aspects of the inventive technique. FIG. 3 is a high-level partial schematic block diagram of a supervisor engine that may be advantageously used with the present invention. Supervisor engine 300 comprises a processor 320, system controller 330, interface logic 360 and memory 340. Interface logic 360 is coupled to the backplane 220, and is configured to transfer data between the backplane 220 and the processor 320.

The memory 340 comprises random access memory (RAM) locations addressable by the system controller 330 for storing, e.g., data structures and software programs. Specifically, the memory 340 is a computer readable medium comprising Dynamic Random Access Memory (DRAM) devices configured to implement a 128 Megabyte (Mb) random-access memory. Memory 340 contains various software and data structures used by processor 320 including software and data structures that implement the present invention. One skilled in the art would know that other computer readable mediums, such as disk storage devices and flash memory devices, may be used to store computer executable instructions that implement aspects of the present invention. Further, one skilled in the art would know that electromagnetic signals may be generated to carry computer executable instructions that implement aspects of the present invention over e.g., a wireless data link or a data network such as the Internet.

Memory 340 contains operating system 342, LSDB 344, FDB 346 and routing process 348. LSDB 344 holds information relating to links in the network, such as physical data links and FAs, that may be used to derive a topology of the network 100.

FDB 344 contains conventional forwarding information, such as L2 and L3 addresses of nodes in the network and interface identifiers (IDs) that identify interfaces (e.g., port 215) through which a node associated with an address, contained in the FDB 344, may be reached. Operating system 342 contains computer executable instructions that functionally organize the intermediate node 200 by, e.g., invoking operations in support of software processes executing on the supervisor engine 300. These processes include routing process 348 which is configured to implement various routing and switching protocols supported by the intermediate node 200 as well as aspects of the present invention.

System controller 330 is coupled to the processor 320 and memory 340, and comprises circuitry configured to enable processor 320 to access (e.g., read, write) memory locations contained in memory 340. Processor 320 is a conventional central processing unit (CPU) configured to execute instructions contained in memory 340 for, inter alia, maintaining LSDB 344 and FDB 346. Specifically, processor 320 executes instructions that acquire information about links and routes associated with the various intermediate nodes 200 contained in network 100 and uses this information to maintain LSDB 344 and FDB 346. Moreover, processor 320 executes instructions to generate advertisement messages containing link and route information known to intermediate node 200 and distribute these advertisement messages to other intermediate nodes 200 in the network that may process this information to maintain their LSDBs and FDBs, accordingly.

Figure 4:
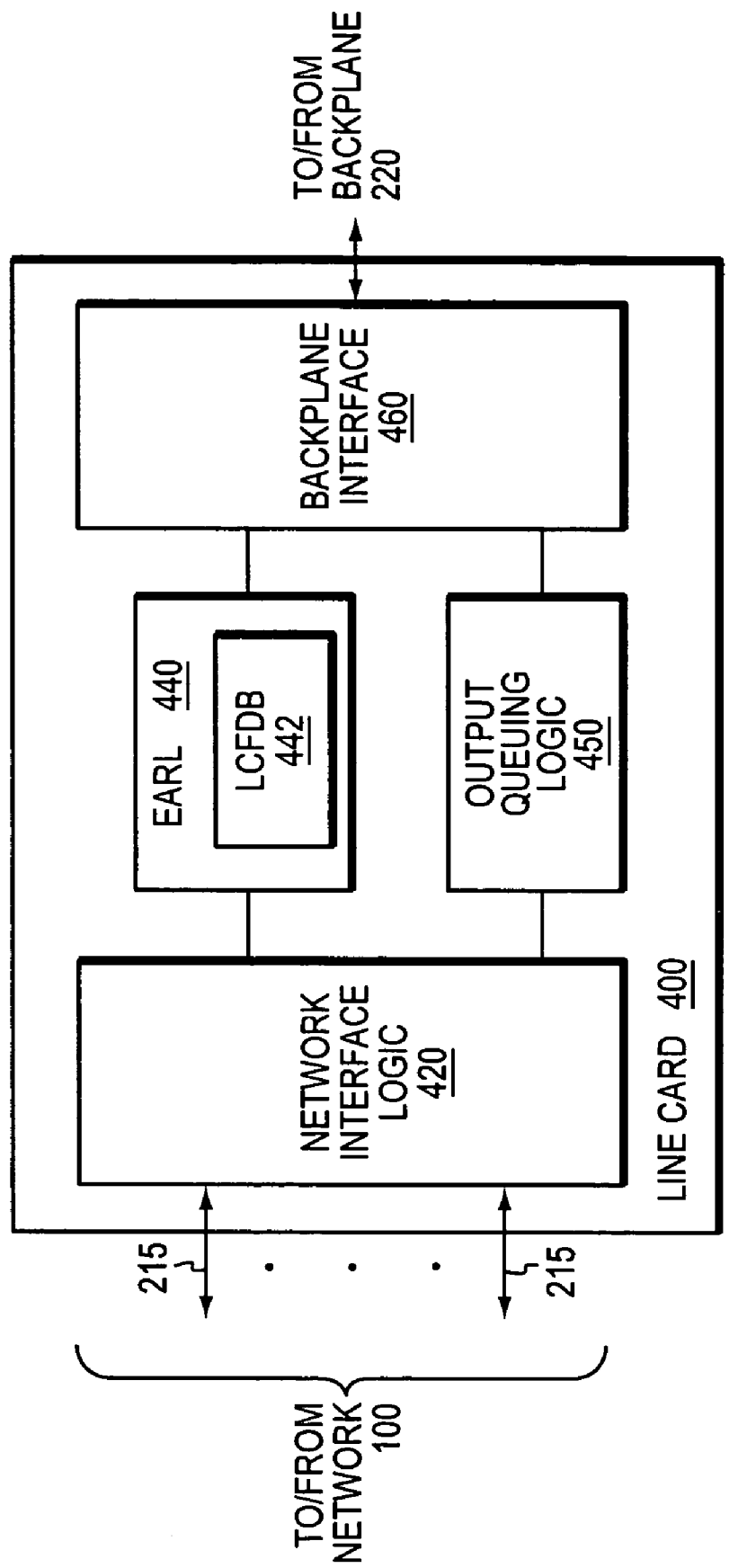
FIG. 4 is a partial schematic block diagram of a line card that may be advantageously used with the present invention.

Data (packets) are transferred to and from the network 100 via the line cards 400. FIG. 4 is a high-level partial schematic block diagram of an exemplary line card 400 that may be advantageously used with the present invention. Line card 400 comprises network interface logic 420, encoded address recognition logic (EARL) 440, backplane interface logic 460 and output queuing logic 450. Further, line card 400 may contain one or more ports 215 coupled to the network 100.

The network interface logic 420 interfaces the line card 400 to the network 100 and enables the line card 400 to transfer data to and from the network 100 via the ports 215. To that end, logic 420 comprises conventional interface circuitry that may incorporate the signal, electrical and mechanical characteristics, and interchange circuits, needed to interface line card 400 with the network's physical media and protocols running over that media.

The backplane interface logic 460 contains circuitry that interfaces the line card 400 to the backplane 220 and enables the line card 400 to transfer and acquire data to and from other cards coupled to the backplane 220. The output queuing logic 450 contains circuitry, such as output queues and scheduling control logic, configured to control the transfer of data packets onto the network 100 via the ports 215. The EARL 440 is illustratively embodied in an application-specific integrated circuit (ASIC) that comprises circuitry configured to, inter alia, acquire and process data packets including making forwarding decisions for the packets using, e.g., a line-card forwarding database (LCFDB) 442 contained in the EARL 440. The LCFDB 442 contains information, such as destination addresses and ports, that enables the EARL 440 to determine destinations for packets processed by the EARL 440.

Operationally, data packets are acquired from the network 100 by the network interface 420 via ports 215 and transferred to the EARL 440 where the packets are processed. This processing may include using the LCFDB 442 to determine a destination for each packet, such as another card coupled to the backplane 220 or a port 215 on the line card 400. After the destination for a packet is determined, the EARL 440 directs the backplane interface 460 to transfer the packet to the destination via the backplane 220, if the destination is another card, or to the output queuing logic 450, if the destination is a port 215 on the line card 400. Data packets destined for the supervisor engine 300 are acquired from the backplane 220 by the interface logic 360 and placed in a packet buffer 350 where they are held for further processing by the processor 320.

Illustratively, intermediate node 200 is configured to execute the OSPF protocol and periodically exchange (advertise) link-state information using advertisement messages called link-state advertisements (LSAs). A version of OSPF that may be used to configure intermediate nodes 200 is described in J. Moy, "OSPF Version 2," Request For Comments (RFC) 2328 available from the Internet Engineering Task Force (IETF), http://www.ietf.org, and which is hereby incorporated by reference as though fully set forth herein. It should be understood that other well-known protocols, such as the IS-IS protocol, may take advantage of the inventive technique.

Figure 5:
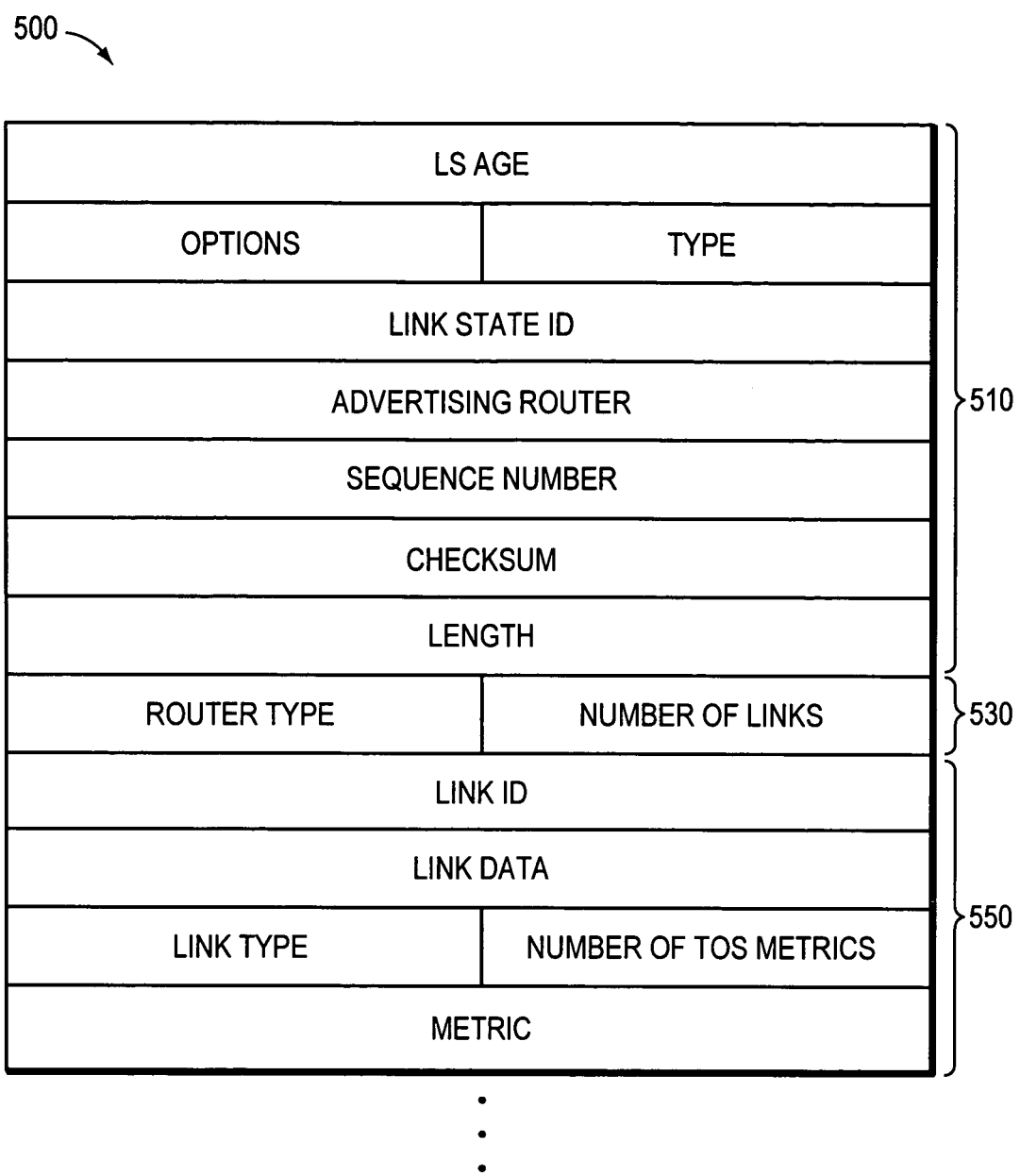
FIG. 5 is a partial schematic block diagram of an Intermediate-System to Open Systems Shortest Path First (OSPF) protocol link-state advertisement (LSA) that may be advantageously used with the present invention.

A LSA is an advertisement message that describes the local state of an intermediate node including, e.g., the link-state of the intermediate node's interfaces, physical data links and FAs. The link-states are flooded throughout the routing domain associated with the intermediate node and form the basis of the information contained in, e.g., the intermediate node's LSDB 344. FIG. 5 is a schematic block diagram of a LSA 500 that may be advantageously used with the present invention. LSA 500 contains a header field 510, a link information header 530 and one or more link information fields 550. The header field 510 contains various information associated with the LSA including an "age" of the LSA, various options, a link-state identifier (ID), the identity of the advertising router, a sequence number of the LSA, a number of link information fields present in the LSA ("number of links") and so on. The link information header 530 includes a router type field containing a value the indicates the type of intermediate node issuing the LSA 500 (e.g., border router, boundary router) and a number of links field which holds a value that indicates the number of link information fields contained in the LSA 500.

Each link information field 550 provides various information about a link advertised by the intermediate node 200. Specifically, field 550 contains a link ID, a link data, a link type, a number of type-of-service (TOS) metrics, a metric and zero or more TOS metrics (not shown). The link ID is a value that identifies the link connected to the intermediate node. The link type is a value that identifies the type of link (e.g., a point-to-point connection to another intermediate node). The link data is a value that represents various information depending on the value of the link type. The number of TOS metrics is a value that represents a number of TOS metrics contained in the link information field. This value is zero if there are not TOS fields present in the LSA 500. Typically, the TOS metrics (not shown) follow the metric and may include values that represent various TOS information associated with the link. The metric is a value that represents a cost associated with the link.

The present invention involves maintaining a FA by treating it as a dynamic entity in that the inventive technique allows a backup tunnel associated with the FA to be used to carry traffic for the FA up to a predetermined amount of time. Afterwards, if the FA does not recover, a network topology change is automatically triggered causing the network to converge on a new network topology. By triggering the network topology change, a path that is more optimal than the path associated with the backup tunnel may be subsequently determined to carry the traffic.

Figure 6:
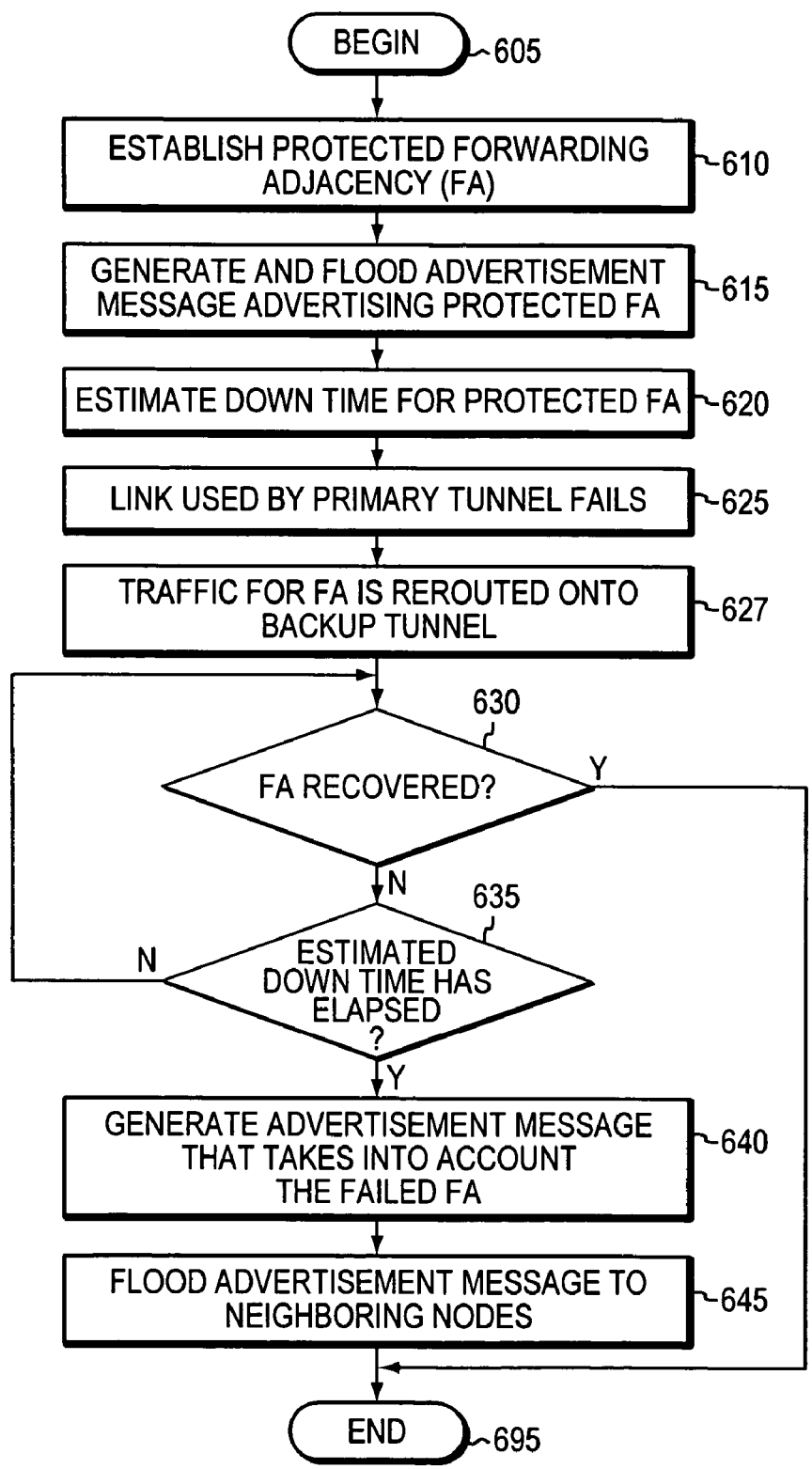
FIG. 6 is a flow diagram of a sequence of steps that may be used to configure an intermediate node to maintain protected forwarding adjacencies (FAs) in accordance with the inventive technique.

FIG. 6 is a flow chart of a sequence of steps that may be used to configure an intermediate node 200 to maintain a protected FA in accordance with the inventive technique. The sequence begins at Step 605 and proceeds to Step 610 where a protected FA is established. Illustratively, the protected FA is established in accordance with the techniques described in K. Kompella, et al., "LSP Hierarchy with Generalized MPLS TE," draft-ietf-mpls-lsp-hierarchy-08.txt, and P. Pan, et al., "Fast Reroute Extensions to RSVP-TE for LSP Tunnels," draft-ietf-mpls-rsvp-fastreroute-04.txt, both available from the IETF and both of which are hereby incorporated by reference as though fully set forth herein. Assume intermediate node 200c establishes a protected FA to intermediate node 200d whose primary tunnel 106a (FIG. 1) spans link 104d from node 200c to node 200d and whose backup tunnel 106b follows a path that includes nodes 200c, 200b, 200a, 200e, 200f, 200g and 200d and spans links 104c, 104b, 104f, 104g, 104h and 104i in that order. In addition, assume the cost associated with each link 104 is the same.

At Step 615 intermediate node 200c generates and floods an advertisement message to its neighboring nodes 200b, 200d, to advertise the protected FA. Illustratively, intermediate node 200c generates a LSA 500 that contains a link information field 550 that identifies the protected FA and floods the LSA 500 to its neighboring nodes 200b, 200d.

At Step 620, intermediate node 200c estimates a "down time" for the protected FA. Illustratively, intermediate node 200c estimates this down time based on a history of failures including, e.g., the duration of the failures for link 104d which is utilized by the protected FA's primary tunnel 106a. Specifically, node 200c determines that for some percentage (e.g., 90%) of failures that occurred on link 104d, the duration of the failure was, e.g., "X" milliseconds (ms). Intermediate node 200c then multiplies X by a factor, e.g., 1.2, to calculate the expected down time of link 104d should it fail. For example, if in 90% of the failures that occurred on link 104d, the link was in a "down" state (i.e., unavailable) for 20 ms and the factor is 1.2, the expected down time for link 104d, should it fail, is 1.2 * 20 ms or 24 ms.

It should be noted that the above-described technique for determining an estimated down time is intended to be merely an illustration of one way that the down time for an FA may be estimated, and is not intended to be a limitation of the invention. Other techniques for estimating down time for a FA may be advantageously used with the inventive technique. For example, a technique that averages the historical down time of links spanned and/or nodes used by the primary tunnel or employs some other statistical method for estimating down time of the links may be used with the present invention.

It should be further noted that for illustrative purposes, primary tunnel 106a is a one-hop tunnel. However, this is not intended to be a limitation of the invention. Rather, the inventive technique may be used with multi-hop tunnels that may span (utilize) more than one link and/or node. Here, the technique used to determine the estimated down time of the FA's primary tunnel may be based on the estimated down times of some combination of physical links and nodes that are used by the protected FA's primary tunnel.

At Step 625, the primary tunnel 106a of the protected FA fails (e.g., link 104d fails) and traffic for the protected FA is rerouted onto its backup tunnel 106b (Step 627). Note that the data traffic now follows a "less optimal" route on the backup tunnel 106b to intermediate node 200d than it did when the primary tunnel 106a was used to carry traffic. That is, the traffic now travels from node 200c to node 200d via nodes 200b, 200a, 200e, 200f and 200g, and via links 104c, 104b, 104f, 104g, 104h and 104i, in that order, on the backup tunnel 106b rather than from node 200c to node 200d via link 104d prior to the failure.

At Step 630, a check is performed by intermediate node 200c to determine if the FA has recovered (e.g., link 104d is no longer failing and the FA's primary tunnel 106a has been re-established through the link 104d). If so, the sequence proceeds to Step 695 where the sequence ends. Otherwise, the sequence proceeds to Step 635 where a check is performed to determine if the failed primary tunnel 106a has been "down" (i.e., not available) for a period of time that matches the estimated down time for that tunnel 106a (i.e., a time that matches the estimated down time for tunnel 106a has elapsed since the tunnel 106a failed). If not, the sequence returns to Step 630.

Otherwise, the sequence proceeds to Step 640 where intermediate node 200c generates an advertisement message that indicates the FA has failed. Illustratively, intermediate node 200c generates a LSA 500 wherein a link information element 550 associated with the protected FA is omitted. Alternatively, intermediate node 200c may generate an advertisement message that indicates a status associated with the FA as unavailable or failed.

At Step 645, intermediate node 200c floods the advertisement message 500 to its neighboring nodes 200b, 200d. Note that flooding (forwarding) the advertisement message 500 triggers a network topology change and causes the intermediate nodes 200 to, e.g., regenerate their FDBs 346 and LSDBs 344 to converge on a new network topology that takes into account the failed FA. At Step 695 the sequence ends.

It should be noted that the above-described embodiment describes the inventive technique as used with FA traffic flowing in one direction (e.g., from node 200c to node 200d). This is not intended to be a limitation of the invention. Rather, in accordance with the operation of FAs, a second set of primary and backup tunnels would normally be established to handle FA traffic that flows in the other direction (e.g., from node 200d to node 200c) an the inventive technique may be adapted to be used with this other set of tunnels as well.

In sum, the inventive technique is an improvement over prior techniques in that it treats a protected FA as a dynamic entity by allowing a backup tunnel associated with a protected FA is used for up to a predetermined amount of time. If the amount of time has elapsed and the FA has not recovered (e.g., the primary tunnel associated with the FA has not been reestablished), an advertisement message that takes into account the failed FA is issued (flooded) to trigger a network topology change. Triggering a topology change causes nodes in the network to converge on a new topology which may contain a route that is more optimal than the backup tunnel and thereby improve network efficiency.

The foregoing description has been directed to specific embodiments of this invention. It will be apparent that other variations and modifications may be made to the described embodiments, with the attainment of some or all of the advantages of the present invention. Therefore, it is an object of the appended claims to cover all such variations and modifications as come within the true spirit and scope of the invention.

The invention claimed is:

1. A method for managing a forwarding adjacency (FA) at an intermediate node in a data network, wherein the FA is associated with a primary tunnel spanning one or more data links in the data network and configured to carry traffic for the FA and a backup tunnel spanning one or more data links in the data network and configured to carry traffic for the FA in the event the primary tunnel fails, the method comprising the steps of:

determining if the backup tunnel has carried traffic for the FA for a predetermined period of time, the predetermined period of time calculated based on a plurality of durations of down time experienced during historical failures along the primary tunnel, each duration of down time corresponding to a different one of the historical failures; and if the backup tunnel has carried traffic for the FA for the predetermined period of time, triggering a network topology change to cause convergence to a new network topology that does not include the FA, the new network topology to no longer use the primary tunnel or the backup tunnel, wherein the FA causes the primary tunnel to be announced as a link, and to appear to intermediate nodes as a single physical data link.

2. The method as defined in claim 1 further comprising the steps of:

detecting a failure of a data link spanned by the primary tunnel; and transferring data destined for the primary tunnel to the backup tunnel.

3. The method as defined in claim 1 wherein the step of triggering comprises:

generating an advertisement message at the intermediate node wherein the advertisement message indicates the FA has failed.

4. The method as defined in claim 3 wherein the advertisement message indicates the FA has failed by excluding a link information element associated with the FA.

5. The method as defined in claim 3 wherein the advertisement message indicates the FA has failed by indicating a status associated with a FA as failed.

6. The method as defined in claim 3 wherein the advertisement message is an Open Systems Path First (OSPF) link state advertisement (LSA) message.

7. The method as defined in claim 3 wherein the advertisement message is an Intermediate-System-to-Intermediate-System (IS-IS) link-state packet message.

8. The method as defined in claim 3 further comprising the step of:

flooding the advertisement message to the intermediate node's neighboring nodes.

9. An intermediate node comprising:

a link-state data base containing an entry representing a forwarding adjacency (FA), wherein the FA is associated with a primary tunnel configured to carry traffic for the FA and a backup tunnel configured to carry traffic for the FA in the event the primary tunnel fails; and a processor configured to determine if the backup tunnel has carried traffic for the FA for a predetermined period of time, the predetermined period of time calculated based on a plurality of durations of down time experienced during historical failures along the primary tunnel, each duration of down time corresponding to a different one of the historical failures, and if the backup tunnel has carried traffic for the FA for the predetermined period of time, trigger a network topology change to cause convergence to a new network topology that does not include the FA, the new network topology to no longer use the primary tunnel or the backup tunnel, wherein the FA causes the primary tunnel to be announced as a link, and to appear to other intermediate nodes as a single physical data link.

10. The intermediate node as defined in claim 9 wherein the processor is configured to detect a failure with a link associated with the primary tunnel and reroute traffic for the FA onto the backup tunnel.

11. The intermediate node as defined in claim 9 wherein the processor is configured to generate an advertisement message wherein the advertisement message indicates the FA has failed.

12. The intermediate node as defined in claim 11 wherein the advertisement message indicates the FA has failed by excluding a link information element associated with the FA.

13. The intermediate node as defined in claim 11 wherein the advertisement message indicates the FA has failed by indicating a status associated with FA as failed.

14. An apparatus for use with a forwarding adjacency (FA) having a primary tunnel and a backup tunnel, the apparatus comprising:

means for determining if the backup tunnel has carried traffic for the FA for a predetermined period of time, wherein the predetermined period of time is calculated based on a plurality of durations of down time experienced during historical failures along the primary tunnel, each duration of down time corresponding to a different one of the historical failures, and the FA causes the backup tunnel to appear to intermediate nodes as a single physical data link; and means for triggering a network topology change if the backup tunnel has carried traffic for the FA for the predetermined period of time to cause convergence to a new network topology that does not include the FA, the new network topology to no longer use the backup tunnel.

15. The apparatus as defined in claim 14 further comprising:

means for generating an advertisement message, wherein the advertisement message indicates the primary tunnel has failed.

16. A computer readable non-transitory medium comprising computer executable instructions for:

determining if the backup tunnel has carried traffic for the FA for a predetermined period of time, wherein the predetermined period of time is calculated based on a plurality of durations of down time experienced during historical failures along the primary tunnel, each duration of down time corresponding to a different one of the historical failures, and the FA causes the backup tunnel to appear to intermediate nodes as a single physical data link; and if the backup tunnel has carried traffic for the FA for the predetermined period of time, triggering a network topology change to cause convergence to a new network topology that does not include the FA, the new network topology to no longer use the backup tunnel.

17. A method comprising:

associating a forwarding adjacency (FA) with a primary tunnel spanning one or more data links to a destination and configured to carry traffic for the FA, the FA causing the primary tunnel to be announced as a link, and to appear to intermediate nodes as a single physical data link;

associating the FA with a backup tunnel spanning one or more data links to the destination and configured to carry traffic for the FA in the event the primary tunnel fails, the FA causing the backup tunnel to be announced as a link, and to appear to intermediate nodes as a single physical data link;

detecting a failure of the primary tunnel;

transferring data destined for the primary tunnel to the backup tunnel; determining that the backup tunnel has carried traffic for the FA for a particular period of time and that the primary tunnel is still not operational, wherein the particular period of time is calculated based on durations of down time experienced during a plurality of historical failures of the one or more data links spanned by the primary tunnel, each duration of down time corresponding to a different one of the historical failures; and in response to the determining, automatically triggering a network topology change to cause convergence to a new network topology that does not include the FA, the new network topology to utilize a new path to reach the destination instead of that of the backup tunnel.

18. The method as defined in claim 17 wherein the new path to reach the destination is more optimal than the backup tunnel.

19. The method as defined in claim 17 wherein triggering comprises:

generating an advertisement message that indicates the FA has failed; and flooding the advertisement message.

20. The method as defined in claim 19 wherein the advertisement message indicates the FA has failed by excluding a link information element associated with the FA.

21. The method as defined in claim 19 wherein the advertisement message indicates the FA has failed by indicating a status associated with a FA as failed.

22. The method as defined in claim 17 wherein the FA is associated with a Multiprotocol Label Switching (MPLS) traffic engineering (TE) label-switched path (LSP).

23. An apparatus comprising:

a link-state database containing an entry representing a forwarding adjacency (FA) wherein the FA is associated with a primary tunnel spanning one or more data links to a destination and configured to carry traffic for the FA, the FA to cause the primary tunnel to be announced as a link, and to appear to intermediate nodes as a single physical data link, and a backup tunnel spanning one or more data links to the destination and configured to carry traffic for the FA in the event the primary tunnel fails; and a processor configured to detect a failure of the primary tunnel, transfer data destined for the primary tunnel to the backup tunnel, determine that the backup tunnel has carried traffic for the FA for a particular period of time and that the primary tunnel is still not operational, wherein the particular period of time is calculated based on durations of down time experienced during a plurality of historical failures of the one or more data links spanned by the primary tunnel, each duration of down time corresponding to a different one of the plurality of historical failures, and, in response to this determination, automatically trigger a network topology change to cause convergence to a new network topology that does not include the FA, the new network topology to utilize a new path to reach the destination instead of that of the backup tunnel.

24. The apparatus as defined in claim 23 wherein the new path to reach the destination is more optimal than the backup tunnel.

25. The apparatus as defined in claim 23 wherein the processor is further configured to generate an advertisement message that indicates the FA has failed and flood the advertisement message on one or more ports.

26. The apparatus as defined in claim 25 wherein the advertisement message indicates the FA has failed by excluding a link information element associated with the FA.

27. The apparatus as defined in claim 25 wherein the advertisement message indicates the FA has failed by indicating a status associated with a FA as failed.

28. The apparatus as defined in claim 23 wherein the FA is associated with a Multiprotocol Label Switching (MPLS) traffic engineering (TE) label-switched path (LSP).

* * * * *